April 16, 1940.   G. L. HASSLER   2,197,453
METHOD OF UNDERGROUND EXPLORATION
Filed Jan. 3, 1938
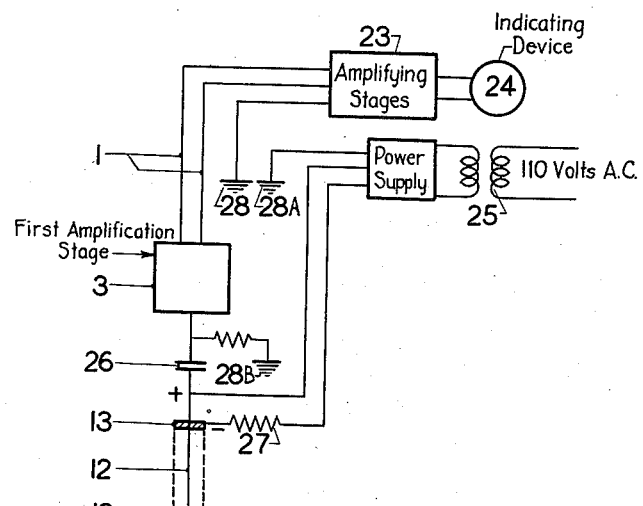
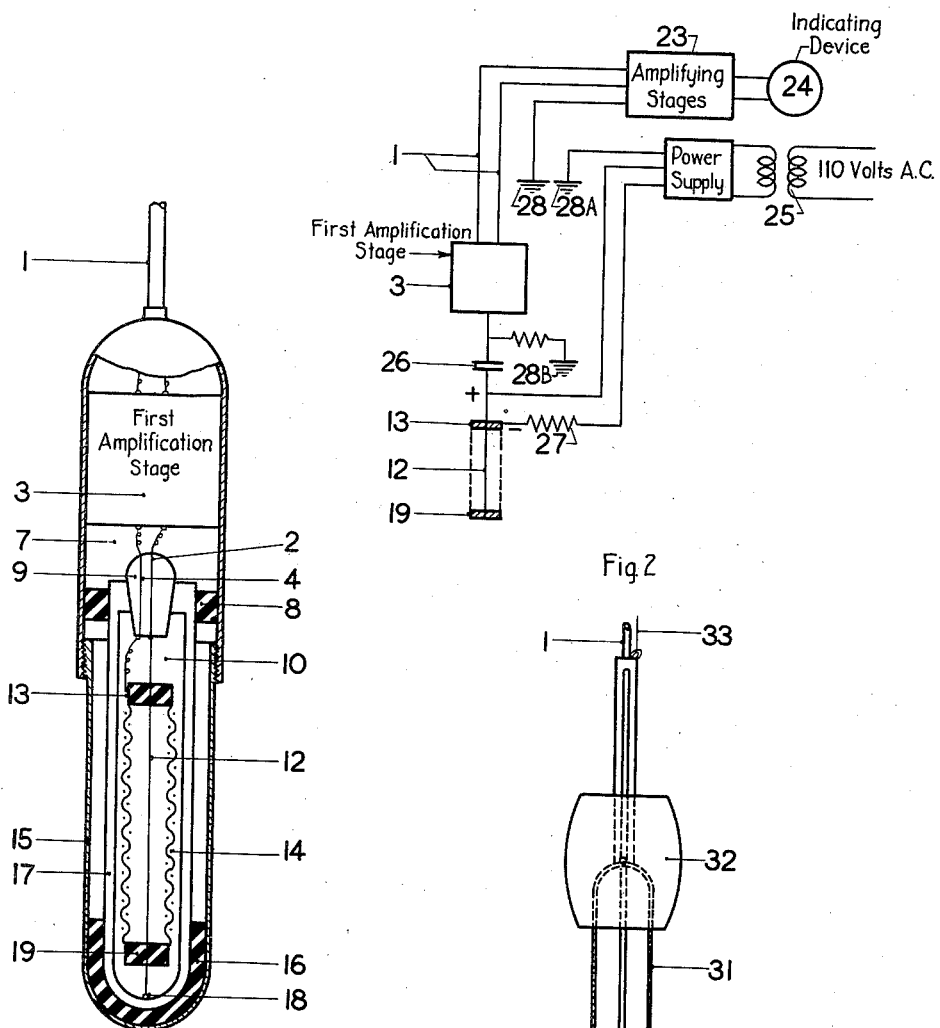
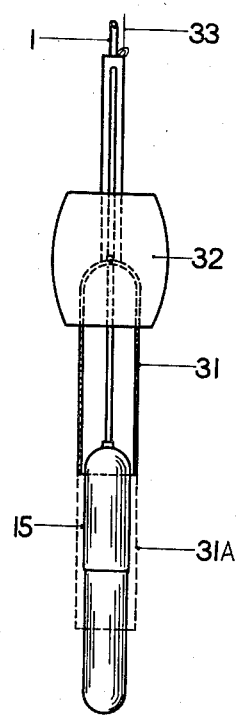
Fig. 1
Fig. 2
Fig. 3
Inventor: Gerald L. Hassler
By his Attorney:

Patented Apr. 16, 1940

2,197,453

UNITED STATES PATENT OFFICE 2,197,453

METHOD OF UNDERGROUND EXPLORATION

Gerald L. Hassler, Berkeley, Calif., assignor to Shell Development Company, San Francisco, Calif., a corporation of Delaware Application January 3, 1938, Serial No. 183,060

2 Claims. (Cl. 250—83)

This invention pertains to the art of electrical exploration of subterranean formations, and relates more specifically to a method of detecting the presence of underground radioactive bodies.

The present method has a special application in exploring the ground for petroleum substances, since it is known that oil, as an organic compound, possesses a very great power of absorbing radioactive gaseous emanations, such as radon. Investigations have shown that kerosene absorbs five times as much of the emanation of thorium, and twenty times as much of the emanation of radium as water. In consequence, crude oils of widely varying origins have in every case been found to exhibit strong radioactive properties.

It is believed that the source of the temporary radioactivity of the oil lies in the deeper rock under the petroleum deposit. These rocks give off radioactive emanations, such as radon, which, because of its greater solubility in oil bodies than in the adjacent water bodies, is effectively trapped by the oil. Since the source of the radioactivity throughout any vertical section, such as a section passing through a borehole, is principally the radon which comes from below, a plot of the relative strength of radiation against depth will reveal a sharp increase of radiation intensity in the proximity of an oil deposit. Although the radioactivity of the connate waters at one place may be stronger than the radioactivity of the oil at another distant place, it may be stated that in the same well the oil will always have a much stronger radiation intensity than the water.

It is, therefore, an object of this invention to provide a method for measuring the radio-activity, and specifically the gamma radiation intensity at various points within a borehole, whereby the presence of oil bodies near said borehole may be accurately determined.

Since gamma rays possess high penetration powers, and will penetrate ordinary steel casing and the cement back of said casing, it is also an object of the present invention to provide a method for investigating the underground strata not only in the uncased, but also in the cased portion of the borehole.

These and other objects of the invention, as well as the construction and arrangement of the apparatus used in practicing the same, will be understood from the following description taken with reference to the attached drawing, wherein:

Fig. 1 shows a diagrammatic cross-sectional view of a casing adapted to be lowered into a borehole and comprising an electrical counter of the Geiger type.

Fig. 2 is a diagram of the electrical connections used for operating the electrical counter, and Fig. 3 is an elevation view of the electric counter casing provided with a hood used to exclude certain types of radiation.

Referring to Fig. 1, the numeral 7 indicates a fluid- and pressure-tight housing or casing having preferably thin walls 15, and made of a suitable metal such as steel or brass. The casing 7 contains an electric counter 10 which is supported therein by any desired means, such, for example, as by a ring 8 and pad 16, made of suitable resilient and shock-absorbing materials, such as rubber.

The electric counter 10 is of the ionization chamber or Geiger-Muller type, which is well known to the art, and will be only briefly described here. It comprises an elongated glass tube 17, hermetically sealed by a glass head 9. Electrical conductors 2 and 4 pass through the head 9, and are fused therein. The particular counter shown in Fig. 1 is of the thin wire anode type, although it is understood that counters of the point or ball anode type can be equally well used.

The conductor 2 is electrically connected to and supports a thin wire 12, made of a suitable material such as iron or thorium-free tungsten which passes axially through the tube 17 and is anchored at the other end by any convenient means, such as a bead 18 fused to the glass tube. The wire 12 passes through and supports cylindrical plugs 13 and 19, made of an insulating material such as amber. A hollow metallic tube 14 is supported between the plugs 13 and 19, being affixed to the outside periphery of each of said plugs. The tube 14 may be formed of a thin sheet of a suitable metal such as chemically pure lead or copper, although it is preferable to employ a screen or metal gauze tube having, for example, from 20 to 100 copper wires per square inch. The screen tube 14 is connected to the conductor 4 and forms the cathode of the electrical counter, the wire 12 being the anode.

The principle of operation of the electrical counter is as follows:

The glass tube 17 is evacuated to a desired degree of vacuum, such as from 0.5 to 12.0 cm. mercury, and a suitable potential, such as from 1500 to 3000 volts is applied between the electrodes, said potential being just below that required for sparking at the given pressure, but somewhat above the critical threshold value at which the electrical counter becomes capable of operation.

If the electrical counter is brought within the range of action of a radio-active body, alpha, beta, and especially gamma particles, due to their penetrating power, will pass through the walls of the casing 7 and tube 17, and enter the ionization chamber formed within the latter. The ionization caused by the entry of a swiftly moving electrified particle into the chamber is magnified due to ionization by collision caused by the intense field near the wire electrode, and will cause, under said conditions, the momentary passage of a detectable current between the electrodes 12 and 14. The passage of this current will, however, reduce the potential difference between the electrodes, thereby quenching said current. The electrical pulses generated in this manner in the counter tube may be suitably amplified and transmitted to an electric indicating or registering device. In the case of strong radiation, the output of the counter may be in the form of a continuous current, which can also be properly detected and measured.

In the apparatus of the present invention, the casing 15 contains also the first amplification stage 3, comprising, for example, a type 24A or '53 radio tube. As shown in Fig. 2, this stage is connected to the electrical counter through a condenser 26, and serves not only to amplify the pulses of the electrical counter, but also to stabilize its action by decreasing its recovery time after the quenching of each pulse.

The pulses amplified by the first amplification stage are transmitted to the surface by means of cable 1, and are there passed through any desired number of further amplification stages, the output of the last stage being connected to an indicating device shown at 24, which may be of the audio type, such as a loudspeaker or head-phones, or of the mechanical counter type, such as a frequency meter or a counting rate meter or a mechanical counter. If the output of the electrical counter is in the form of a continuous current, the indicating device 24 may consist of a sensitive galvanometer or electrometer. In all cases, an oscillograph may be used in conjunction with the indicating device 24 to produce a photographic record of the response of the electrical counter to radioactive bodies.

The power supply necessary for operating the present device is shown at 25, and may comprise, for example, an ordinary 110 volts supply line provided with a small 2000 volts transformer which charges a condenser of about 2 microfarads capacity through a kenotron and a choke coil. The whole apparatus is suitably insulated and properly grounded, as shown at 28, 28A and 28B, in a manner well known to those familiar with the electric art.

The device of the present invention is especially well adapted for use in exploratory boreholes, that is, in relatively small-diameter boreholes drilled to determine the presence of oil in underground formations. The use of the present device in exploratory boreholes avoids the necessity of continuous coring, which is a relatively slow and costly process. The device, however, can equally well be used in ordinary boreholes, whether cased or uncased.

In operation, the apparatus contained in housing 15 is lowered into the borehole at the end of the insulated cable 1, which carries the necessary electrical conductors. The cable 1 passes over a suitably calibrated wheel, whereby the exact depth of the housing 15 is known at every moment. As the electric counter is lowered into the borehole, the indicator 24 will register a certain counting rate, known as the background counting rate, which is due to the action of cosmic rays and to normal radioactive contamination. The presence of a radioactive body of oil will, however, be immediately indicated by a sharp rise in said count, or in the value of the continuous current supplied by the electrical counter to the indicator 24. The readings of the indicator 24 may be checked by obtaining a second set of values while raising the housing 15 through the borehole.

As stated above, the present device may be equally well used for exploration in the uncased and the cased portion of a borehole. Thus, it may be used in the uncased portion of a well when no oil has been found at the expected level, and a definite indication is desired before continuing the drilling or abandoning the well. Since the gamma rays have a sufficient penetration to pass through the ordinary well casing and the cement behind it, the use of the electrical counter is of special advantage in the cased portion of a well, when it is believed that an oil layer had been passed through and cemented off during drilling. In such cases, if a positive indication is obtained at a certain level by means of the electrical counter, the casing may be perforated at said level by means, for example, of a gun perforator, and oil produced in known manner. It must be noted, however, that in such cases, and particularly in cases when oil had been previously produced from the bottom of the well, the casing must be carefully swabbed and cleaned before running the electrical counter in, since the presence of irregular deposits of a radioactive oil on the walls of the casing may result in incorrect readings of the device.

The object of the cleaning or swabbing process is to secure not necessarily the absence of radioactive substances, but a homogeneous distribution of them, so that the "background count" is uniform.

When, in effecting determinations by means of the present device, it is desired for various reasons to differentiate between rays of various types and intensities or to check whether the count of the indicator 24 is actually due to the presence underground of some radioactive body, or is merely the background counting rate, the present device may be used in combination with a hood of known absorbing power made of a suitable material such as lead or aluminum, as shown at 31, Fig. 3, which may be made to cover the casing 15, as shown in dotted lines at 31A, so as to exclude all or certain undesirable rays. The hood permits measurement of the "absorption coefficient" which depends on the wave length of the gamma rays. This process will differentiate between oil and spurious gamma radiation. Alpha and beta rays will generally not penetrate the counter because these are very easily absorbed, and only "secondary" alpha and beta rays will be recorded by the counter.

The hood 31 may be positioned in any desired manner with regard to the casing 15 by any suitable means, for example, by means of an electrically operated solenoid or magnet 32, attached to the cable 1, or mechanically by means of an auxiliary cable 33, or simply by adjusting the hood 31 by manual operation at the surface.

I claim as my invention:

1. In an apparatus for exploring underground formations for the presence of radioactive bodies, an elongated casing adapted to be lowered into a borehole, an electrical counter within the casing, said counter comprising an evacuated ionization chamber containing two electrodes, means to impress between said electrodes a potential below that necessary for sparking but sufficient to cause a momentary current to flow between the electrodes when an ionizing electrified particle from a radioactive body enters said chamber, means within said casing to amplify said current, a tubular hood of known absorbing power for radioactive radiation adapted to slide over said casing, means extending to the surface for causing a limited co-axial motion of said hood with regard to the casing, an electrical indicating device at the surface, and means to convey to said device the amplified indications of the electrical counter.

2. In an apparatus for exploring underground formations for the presence of radioactive bodies, an elongated casing adapted to be lowered into a borehole, said casing comprising a detector sensitive to the radiations of said bodies, means to amplify the indications of said detector, a tubular hood of known absorbing power for said radiations capable of co-axial motion with regard to said casing, means extending to the surface for controlling the amount of radiations reaching the detector by causing a limited co-axial motion of said hood with regard to the casing, an electrical indicating device at the surface, and means to convey to said device the amplified indications of the detector.

GERALD L. HASSLER.